(12) United States Patent
Nielson et al.

(10) Patent No.: US 10,175,401 B2
(45) Date of Patent: *Jan. 8, 2019

(54) DUAL-PURPOSE, ABSORPTIVE, REFLECTIVE WIRE GRID POLARIZER

(71) Applicant: Moxtek, Inc., Orem, UT (US)

(72) Inventors: R. Stewart Nielson, Pleasant Grove, UT (US); Bradley R. Williams, Pocatello, ID (US)

(73) Assignee: Moxtek, Inc., Orem, UT (US)

(*) Notice: Subject to any disclaimer, the term of this patent is extended or adjusted under 35 U.S.C. 154(b) by 232 days.

This patent is subject to a terminal disclaimer.

(21) Appl. No.: 15/265,210

(22) Filed: Sep. 14, 2016

(65) Prior Publication Data

US 2017/0139095 A1    May 18, 2017

Related U.S. Application Data

(60) Provisional application No. 62/254,259, filed on Nov. 12, 2015.

(51) Int. Cl.
| | | |
|---|---|---|
| G02B 5/30 | (2006.01) | |
| G02B 27/28 | (2006.01) | |
| G03B 21/20 | (2006.01) | |

(52) U.S. Cl.
CPC ....... G02B 5/3058 (2013.01); G03B 21/2073 (2013.01)

(58) Field of Classification Search
CPC ...... G02B 5/3058; G02B 5/3025; G02B 1/08; G02B 5/3083; G02B 5/30; G02B 1/12; G02F 2001/133548; G02F 1/133528; G02F 1/133536; G02F 1/133308; G02F 1/133345; G02F 1/13362; G02F 1/13363; B82Y 20/00

See application file for complete search history.

(56) References Cited

U.S. PATENT DOCUMENTS

| | | |
|---|---|---|
| 4,763,972 A | 8/1988 | Papuchon et al. |
| 6,447,120 B1 | 9/2002 | Hansen et al. |

(Continued)

FOREIGN PATENT DOCUMENTS

| | | |
|---|---|---|
| DE | 10327963 | 1/2005 |
| DE | 10341596 | 4/2005 |

(Continued)

OTHER PUBLICATIONS

Moxtek, Inc., "Wire Grid Polarizer with Dual Absorptive Regions." U.S. Appl. No. 14/731,948, filed Jun. 5, 2015.

(Continued)

*Primary Examiner* — William R Alexander
*Assistant Examiner* — Tamara Y. Washington
(74) *Attorney, Agent, or Firm* — Thorpe, North & Western, LLP

(57) ABSTRACT

A WGP 10 can include an array of parallel, elongated rods 14 located over a surface of a transparent substrate 11 with gaps 15 between adjacent rods 14. Each of the rods 14 can include a reflective wire 13 sandwiched between ribs 12. One of the ribs 12 can be a transparent rib and one can be an absorptive rib. The WGP 10 can have high efficiency and high contrast for light entering on the transparent rib side and low Rs for light entering on the absorptive rib side.

20 Claims, 3 Drawing Sheets

(56) References Cited

U.S. PATENT DOCUMENTS

| | | |
|---|---|---|
| 6,585,378 B2 | 7/2003 | Kurtz et al. |
| 7,113,335 B2 | 9/2006 | Sales |
| 7,233,563 B2 | 6/2007 | Ueki et al. |
| 7,414,784 B2 | 8/2008 | Mi et al. |
| 7,570,424 B2 | 8/2009 | Perkins et al. |
| 7,961,393 B2 | 6/2011 | Perkins et al. |
| 8,049,841 B2 | 11/2011 | Sugita et al. |
| 8,755,113 B2 | 6/2014 | Gardner et al. |
| 9,684,203 B2* | 6/2017 | Nielson ................. G02B 5/3058 |
| 2005/0275944 A1 | 12/2005 | Wang et al. |
| 2005/0277063 A1 | 12/2005 | Wang et al. |
| 2007/0242352 A1 | 10/2007 | Macmaster |
| 2007/0296921 A1 | 12/2007 | Wang et al. |
| 2008/0055723 A1 | 3/2008 | Gardner et al. |
| 2008/0316599 A1 | 12/2008 | Wang et al. |
| 2009/0041971 A1* | 2/2009 | Wang ................... G02B 5/1809 428/54 |
| 2009/0231702 A1 | 8/2009 | Wu et al. |
| 2010/0103517 A1 | 4/2010 | Davis et al. |
| 2014/0063467 A1 | 3/2014 | Takahashi et al. |
| 2015/0077851 A1 | 3/2015 | Wang et al. |
| 2015/0116824 A1 | 4/2015 | Wang et al. |
| 2015/0131150 A1 | 5/2015 | Probst et al. |
| 2016/0062017 A1 | 3/2016 | Nielson et al. |
| 2016/0357064 A1* | 12/2016 | Nielson ................. G02B 5/3058 |
| 2017/0293059 A1* | 10/2017 | Nielson ................... C23C 14/58 |

FOREIGN PATENT DOCUMENTS

| | | |
|---|---|---|
| DE | 102004/041222 | 3/2006 |
| WO | WO 2012/053754 A2 | 4/2012 |

OTHER PUBLICATIONS

Moxtek, Inc., "Wire Grid Polarizer with Water Soluble Materials." U.S. Appl. No. 15/078,549, filed Mar. 23, 2016.

* cited by examiner

DUAL-PURPOSE, ABSORPTIVE, REFLECTIVE WIRE GRID POLARIZER

CLAIM OF PRIORITY

This application claims priority to U.S. Provisional Patent Application No. 62/254,259, filed on Nov. 12, 2015, which is hereby incorporated herein by reference in its entirety.

FIELD OF THE INVENTION

The present application is related generally to wire grid polarizers, especially beam-splitters.

BACKGROUND

Wire grid polarizers (WGP for singular or WGPs for plural) can transmit one polarization (e.g. p-polarization) and reflect or absorb an opposite polarization (e.g. s-polarization). High reflectivity of the opposite polarization (e.g. high Rs) can be important because some applications use both polarized light beams (e.g. s & p). High absorption/low reflectivity of the opposite polarization (e.g. low Rs) can be important because reflection of this polarization (Rs) can interfere with the optical system. For example, the reflected s-polarization can cause ghosting in an image projector. Some WGPs are designed for high reflection and others for high absorption of the s-polarization.

High transmission of one polarization (e.g. high Tp) can be an important feature of WGPs in order to minimize light-source power requirements. Low transmission of the opposite polarization (e.g. Ts) can be important for improved light image resolution. The quality or effectiveness of WGPs can be shown by efficiency (Tp*Rs) and contrast (Tp/Ts). It can be difficult to optimize both efficiency and contrast, so one WGP design can be optimized for efficiency and another WGP design can be optimized for contrast.

SUMMARY

It would be advantageous to optimize a wire grid polarizer (WGP for singular or WGPs for plural) for both desired efficiency (Tp*Rs) and high contrast (Tp/Ts). The present invention is directed to various embodiments of WGPs that satisfy these needs. Each embodiment may satisfy one, some, or all of these needs.

The WGP can comprise an array of parallel, elongated rods located over a surface of a transparent substrate with gaps between adjacent rods. Each of the rods can include a reflective wire sandwiched between a transparent rib and an absorptive rib.

DEFINITIONS

Figure 1:
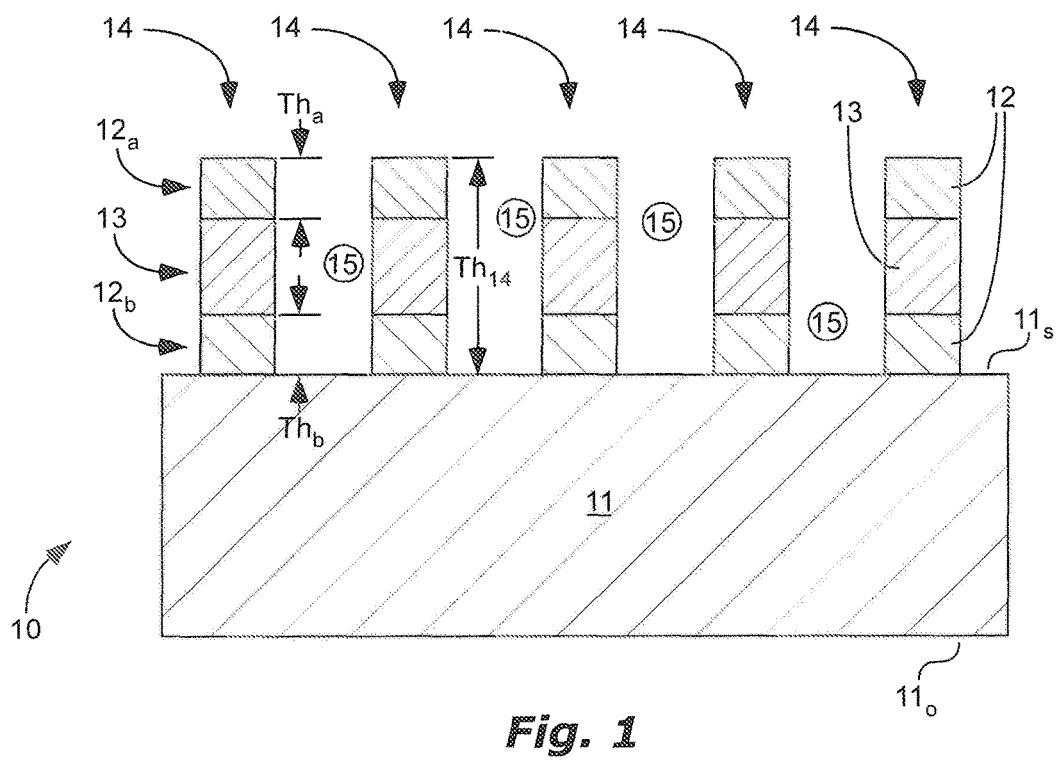
FIG. 1 is a schematic cross-sectional side view of a wire grid polarizer (WGP for singular or WGPs for plural) 10 including an array of parallel, elongated rods 14 located over a surface of a transparent substrate 11 with gaps 15 between adjacent rods 14. Each of the rods 14 can include a reflective wire 13 sandwiched between two ribs 12. One of the ribs 12 can be a transparent rib and one can be an absorptive rib, in accordance with an embodiment of the present invention.

As used herein, the term "contrast" means a fraction of transmission through the WGP of the predominantly transmitted polarization (e.g. Tp) divided by a fraction of transmission through the WGP of an opposite polarization (e.g. Ts). For example, contrast=Tp/Ts.

As used herein, the term "efficiency" means a fraction of transmission through the WGP of the predominantly transmitted polarization (e.g. Tp) times a fraction of reflection of an opposite polarization (e.g. Rs) off of the WGP. For example, efficiency=Tp*Rs.

As used herein, the term "elongated" means that a length L of the rods 14 is substantially greater than rod width W and/or rod thickness $Th_{14}$. For example, WGPs for ultraviolet or visible light can have a rod width W between 20 and 100 nanometers and rod thickness between 50 and 500 nanometers; and rod length L of about 1 millimeter to 20 centimeters or more, depending on the application. Thus, elongated rods 14 can have a length L that is many times (e.g. at least 10 times in one aspect, at least 100 times in another aspect, at least 1000 times in another aspect, or at least 10,000 times in another aspect) larger than rod width w and/or rod thickness $Th_{14}$. The term "elongated" can also mean that the length L of the rods 14 is longer than any wavelength in the wavelength range of intended use. Thus, the length L can be greater than 700 nm, the longest wavelength of visible light.

As used herein, the term "Rs" means a percent or fraction reflection of the polarization of which it is desired to minimize transmission.

Many materials used in optical structures absorb some light, reflect some light, and transmit some light. The following definitions are intended to distinguish between materials or structures that are primarily absorptive, primarily reflective, or primarily transparent.

1. As used herein, the term "absorptive" means substantially absorptive of light in the wavelength of interest.
    a. Whether a material is "absorptive" is relative to other materials used in the polarizer. Thus, an absorptive structure will absorb substantially more than a reflective or a transparent structure.
    b. Whether a material is "absorptive" is dependent on the wavelength of interest. A material can be absorptive in one wavelength range but not in another.
    c. In one aspect, an absorptive structure can absorb greater than 40% and reflect less than 60% of light in the wavelength of interest (assuming the absorptive structure is an optically thick film—i.e. greater than the skin depth thickness).
    d. In another aspect, an absorptive material can have a high extinction coefficient (k), relative to a transparent material, such as for example greater than 0.01 in one aspect or greater than 1.0 in another aspect.
    e. Absorptive ribs can be used for selectively absorbing one polarization of light.
2. As used herein, the term "reflective" means substantially reflective of light in the wavelength of interest.

a. Whether a material is "reflective" is relative to other materials used in the polarizer. Thus, a reflective structure will reflect substantially more than an absorptive or a transparent structure.

b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.

c. In one aspect, a reflective structure can reflect greater than 80% and absorb less than 20% of light in the wavelength of interest (assuming the reflective structure is an optically thick film—i.e. greater than the skin depth thickness).

d. Metals are often used as reflective materials.

e. Reflective wires can be used for separating one polarization of light from an opposite polarization of light.

3. As used herein, the term "transparent" means substantially transparent to light in the wavelength of interest.

a. Whether a material is "transparent" is relative to other materials used in the polarizer. Thus, a transparent structure will transmit substantially more, than an absorptive or a reflective structure.

b. Whether a material is "transparent" is dependent on the wavelength of interest. A material can be transparent in one wavelength range but not in another.

c. In one aspect, a transparent structure can transmit greater than 90% and absorb less than 10% of light at the wavelength of interest or wavelength range of use, ignoring Fresnel reflection losses.

d. In another aspect, a transparent structure can have an extinction coefficient (k) of less than 0.01 or less than 0.001 at the wavelength of interest or wavelength range of use.

4. As used in these definitions, the term "material" refers to the overall material of a particular structure. Thus, a structure that is "absorptive" is made of a material that as a whole is substantially absorptive, even though the material may include some reflective or transparent components. Thus for example, a rib made of a sufficient amount of absorptive material so that it substantially absorbs light is an absorptive rib even though the rib may include some reflective or transparent material embedded therein.

DETAILED DESCRIPTION

Figure 2:
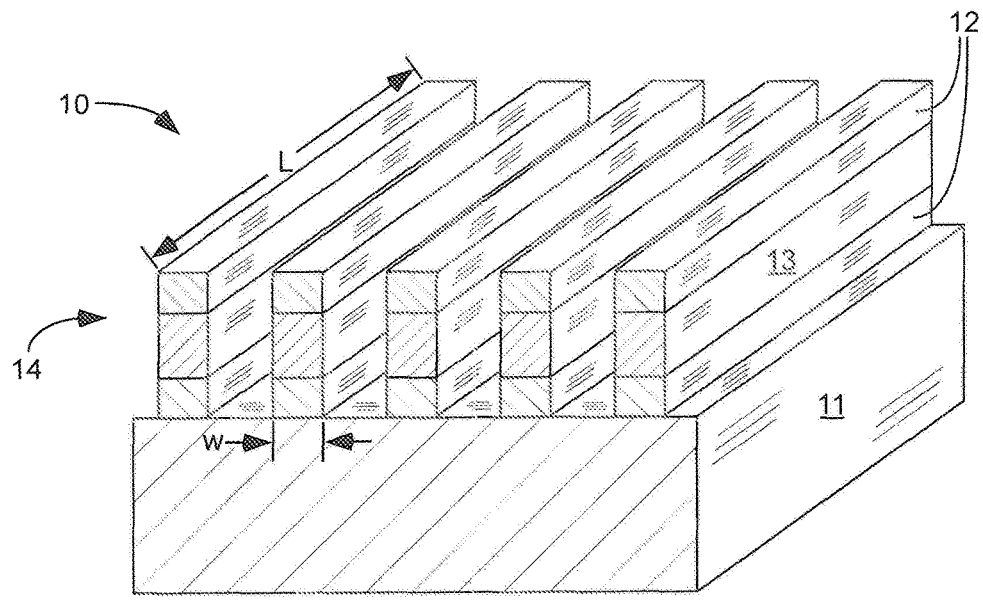
FIG. 2 is a schematic perspective view of the WGP 10 of FIG. 1, in accordance with an embodiment of the present invention.

As illustrated in FIGS. 1-2, a wire grid polarizer (WGP for singular or WGPs for plural) 10 is shown comprising an array of parallel, elongated rods 14 located over a surface $11_s$ of a transparent substrate 11 (e.g. glass) with gaps 15 between adjacent rods 14. Each of the rods 14 can include a reflective wire 13 sandwiched between two ribs 12. One of the ribs 12 can be a transparent rib and one can be an absorptive rib.

In one embodiment, the absorptive rib can be a rib $12_b$ located closer to the substrate 11 and the transparent rib can be a rib $12_a$ located farther from the substrate 11. In another embodiment, the transparent rib can be the rib $12_b$ located closer to the substrate 11 and the absorptive rib can be the rib $12_a$ located farther from the substrate 11. A decision of whether the absorptive rib or the transparent rib is the rib $12_b$ located closer to the substrate 11 can be based on (1) whether incident light faces the surface $11_s$ on which the elongated rods 14 are located or whether incident light faces an opposite side $11_o$ of the substrate 11; (2) whether the desired light beam is primarily reflected or transmitted; and (3) whether high reflection (high Rs) or high absorption (low Rs) is desired.

For example, if the absorptive rib is located closer to the substrate 11 and light faces the surface $11_s$ on which the elongated rods 14 are located, the transparent rib can, together with the reflective wire 13, increase reflection of one polarization (e.g. increase Rs) and the absorptive rib can increase contrast (e.g. increase Tp/Ts). For light incident on the opposite side $11_o$ of the substrate 11, the absorptive rib can absorb s-polarization, and thus decrease Rs. Therefore, one WGP 10 can have both high efficiency (Tp*Rs) and high contrast (Tp/Ts) for light incident on the surface $11_s$ on which the elongated rods 14 are located and can have high absorption of s-polarization (low Rs) for light incident on the opposite side $11_o$ of the substrate 11.

For example, for a wavelength of visible light (e.g. 450, 550, or 650 nanometers) incident from a 45° angle on a transparent rib side of the WGP, the WGP 10 can have efficiency of at least 85% in one aspect, at least 87% in another aspect, or at least 89% in another aspect and/or the WGP 10 can have contrast of at least 2000 in one aspect, at least 3000 in another aspect, at least 3500 in another aspect, or at least 4000 in another aspect. Another example, for a wavelength of visible light (e.g. 450, 550, or 650 nanometers) incident from a 45° angle on an absorptive rib side of the WGP, the WGP 10 can have Rs of less than 15% in one aspect, less than 10% in another aspect, or less than 5% in another aspect.

Figure 3:
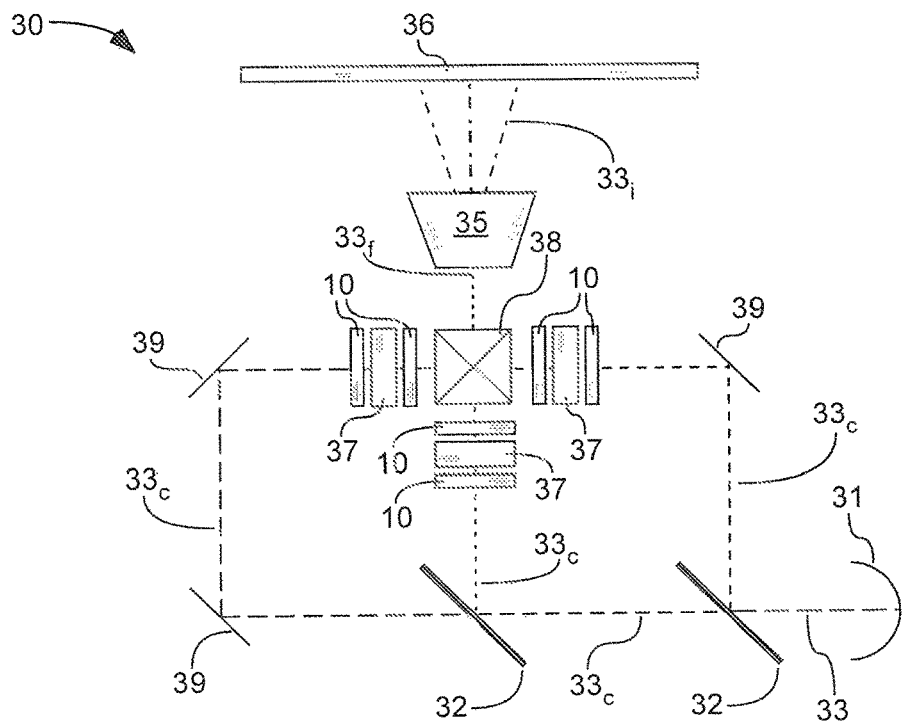
FIGS. 3-4 show image projection systems 30 and 40, each including WGP(s) 10 accordance with embodiments of the present invention.
Figure 4:
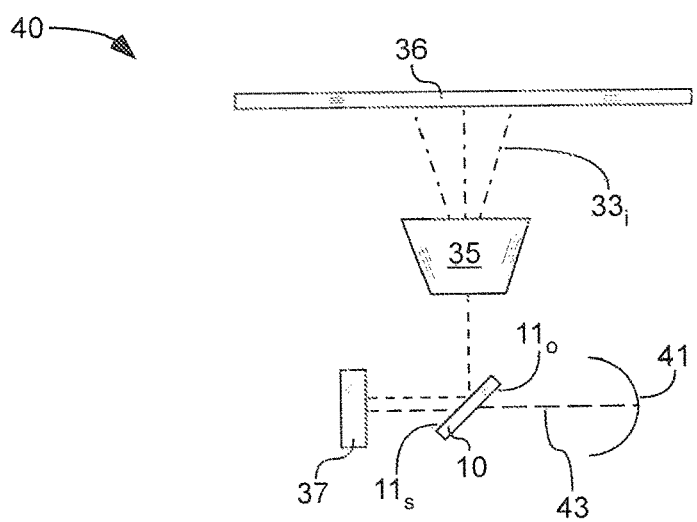

Dual-purpose, absorptive, reflective WGPs, with both high contrast and high efficiency, can be useful in image projectors, such as for example image projector 30 shown in FIG. 3 or image projector 40 shown in FIG. 4. The image projector 30 or 40 can comprise a light source 31 or 41 capable of emitting a beam of light 33 or 43, a projection lens system 35, spatial light modulator(s) 37, and WGP(s) 10 according to WGP embodiments described herein.

The projection lens system 35 can be located to receive at least part of the beam of light 33 or 43 and can project an image. Projection lens systems 35 are described in U.S. Pat. Nos. 6,585,378 and 6,447,120, which are hereby incorporated herein by reference in their entirety.

The spatial light modulator 37 can be located to receive, in a light path between the light source 31 or 41 and the projection lens system 35, at least part of the beam of light 33 or 43. The spatial light modulator 37 can have a plurality of pixels, each pixel capable of receiving a signal. The signal can be an electronic signal. Depending on whether or not each pixel receives the signal, or the strength of the signal, the pixel can rotate a polarization of, or transmit or reflect without causing a change in polarization of, the part of the beam of light 33 or 43. The spatial light modulator(s) 37 can be a liquid crystal device/display (LCD) and can be transmissive, reflective, or transflective.

The WGP(s) 10 can be located in at least part of the beam of light 33 or 43 prior to entering the spatial light modulator 37, after exiting the spatial light modulator 37, or both. The WGP(s) 10 help form the image by transmitting, reflecting, or absorbing light of each pixel depending on the type of WGP 10 and whether each pixel received the signal.

As shown in FIG. 3, image projector 30 can further comprise color-splitting optics 32 and color-combining optics 38. The light source 31 can emit a beam of light 33, which can initially be unpolarized. The color-splitting optics 32 can be located to receive at least part of the beam of light 33, can be located between the light source 31 and the spatial light modulator 37 and can split the beam of light 33 into multiple, differently-colored light beams, defining colored beams $33_c$. The colored beams $33_c$ can be primary colors.

The color-combining optics 38 can be located between the spatial light modulator 37 and the projection lens system 35 and can be located to receive at least part of the colored beams $33_c$. The color-combining optics 38 can recombine at least part of the colored beams $33_c$ into a final beam or combined beam $33_f$. Color-combining optics 38 are used in computer projectors for combining different colors of light into a single image to be projected. Color-combining optics 38 are sometimes called X-Cubes, X-Cube prisms, X-prisms, light recombination prisms, or cross dichroic prisms. X-Cubes are typically made of four right angle prisms, with dichroic coatings, that are cemented together to form a cube.

The projection lens system 35 can be located to receive the combined beam $33_f$ and can project a colored image $33_i$. The colored image $33_i$ can be projected onto a screen 36 or into an eye of a person.

The spatial light modulator 37 can be located to receive, in a light path between the color-splitting optics 32 and the color-combining optics 38, at least one of the colored beams $33_c$. The image projector 30 can include a spatial light modulator 37 for each of the colored beams $33_c$. The WGP(s) 10 can be located in at least one of the colored beams $33_c$ prior to entering the spatial light modulator 37, after exiting the spatial light modulator 37, or both.

As shown on image projector 40 in FIG. 4, the light source 41 can sequentially emit multiple, differently-colored light beams, defining colored beams 43 (thus the beam of light 41 can be defined as colored beams 43). The colored beams 43 can be primary colors. The projection lens system 35 can be located to receive the colored beams 43 and can project a colored image $33_i$. The colored image $33_i$ can be projected onto a screen 36 or into an eye of a person. The spatial light modulator 37 can be located to receive, in a light path between the light source 41 and the projection lens system 35, the colored beams 43. The WGP 10 can be located in the colored beams 43 prior to entering the spatial light modulator 37, after exiting the spatial light modulator 37, or both.

For both image projectors 30 and 40, light entering the WGP 10 on the transparent rib side can be polarized with high contrast and high efficiency; and s-polarized light entering the WGP 10 on the absorptive rib side can be absorbed. The absorptive rib can be closer to or farther than the transparent rib to the spatial light modulator 37, the light source 31 or 41, or to the projection lens system 35, depending on whether high contrast and high efficiency is desired or whether high absorption of one polarization is desired.

In one embodiment, the absorptive rib can face or be closer to the light source 41 or incoming light beam and/or the transparent rib can face or be closer to the spatial light modulator 37. For example, the absorptive rib can be rib $12_b$ located closer to the substrate 11. A side $11_o$ of the substrate 11 that is opposite of the surface $11_s$ on which the elongated rods 14 are located can be located closer to the light source 41. The WGP can selectively absorb most of one polarization of light (e.g. Ts) and transmit most of an opposite polarization (e.g. Tp). The transparent rib can be the rib $12_a$ located farther from the substrate 11 and the surface $11_s$ on which the elongated rods 14 are located can be located closer to the spatial light modulator 37. The WGP can selectively reflect most of one polarization of light (e.g. Tp) coming from the spatial light modulator 37.

For optimal transmission of the desired polarization (e.g. for high Tp), it can be beneficial for the transparent rib to have a high index of refraction (n) and a low extinction coefficient (k). For example, the transparent rib can have, at a light wavelength or wavelength range of intended use (e.g. visible light, 400-500 nanometers, 500-600 nanometers, or 600-700 nanometers), an index of refraction (n) of greater than 1.9 in one aspect, greater than 2.0 in another aspect, greater than 2.2 in another aspect, or greater than 2.4 in another aspect and/or an extinction coefficient (k) of less than 0.01 in one aspect, less than 0.001 in another aspect, or less than 0.0001 in another aspect.

A material of the transparent rib can be different from a material of the transparent substrate 11. The transparent rib can be spaced apart from the transparent substrate 11.

Examples of transparent rib materials include aluminum nitride, hafnium oxide, silicon carbide, silicon nitride, tantalum pentoxide, titanium dioxide, zinc sulfide, or combinations thereof. Due to imperfections in deposition of the transparent rib, these chemical combinations are not necessarily in exact stoichiometric ratios. For example, the term "titanium dioxide" means approximately one titanium atom for every two oxygen atoms, such as for example $Ti_xO_y$, where $0.9 \leq x \leq 1.1$ and $1.9 \leq y \leq 2.1$. As another example, silicon nitride generally refers to $Si_3N_4$, but as used herein, the term silicon nitride means approximately three silicon atoms for every four nitrogen atoms, such as for example $Si_vN_z$ where $2.9 \leq v \leq 3.1$ and $3.9 \leq z \leq 4.1$.

By selection of a material with proper index of refraction (n) and extinction coefficient (k), the transparent rib can have high transmissivity and low absorption. For example, material of the transparent rib, at a thickness ($Th_a$ or $Th_b$) of the transparent rib, can transmit greater than 90% and absorb less than 10% of light in the wavelength range of use, ignoring Fresnel reflection losses.

The absorptive rib can have a high extinction coefficient (k), relative to the transparent rib. For example, the absorptive rib can have an extinction coefficient (k) of greater than 0.01 in one aspect or greater than 1.0 in another aspect. The absorptive rib can include at least 80 mass percent silicon or at least 80 mass percent germanium.

The reflective wire 13 can be made of electrically conductive and reflective materials, such as metals. For example, the reflective wire 13 can include at least 99 mass percent aluminum.

The WGP can include more than one absorptive rib, as described in U.S. patent application Ser. No. 14/937,488 filed on Nov. 10, 2015, which claims priority to U.S. Provisional Patent Application No. 62/104,371, filed on Jan. 16, 2015; both of which are hereby incorporated herein by reference in their entirety.

Figure 5A:
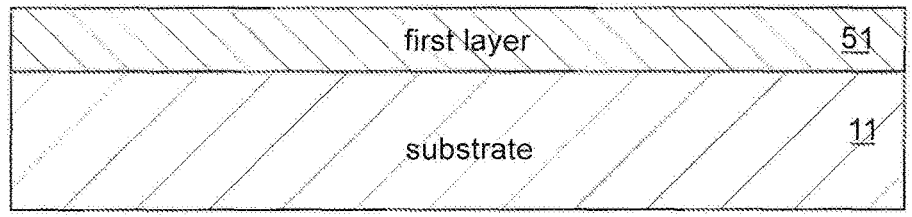
FIGS. 5a-c show steps in a method of making a WGP, in accordance with an embodiment of the present invention.
Figure 5B:
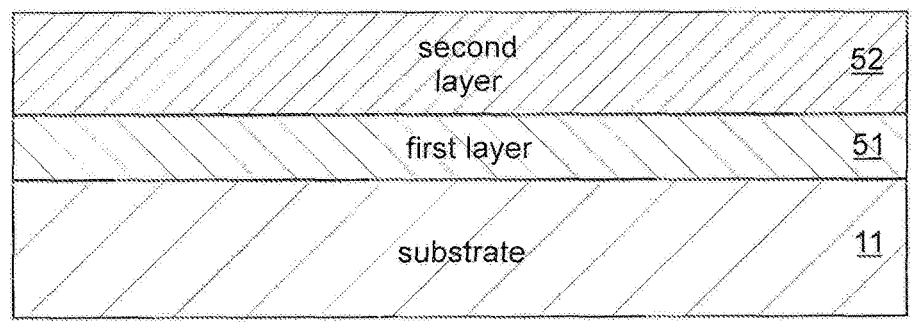
Figure 5C:
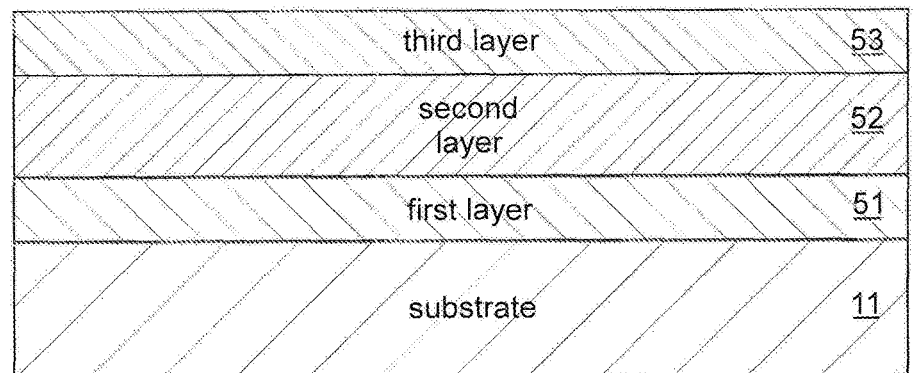

A method of making a WGP can include the following steps, which can be performed in the order described:
1. Depositing a first layer 51 over a surface $11_s$ of a transparent substrate 11. See FIG. 5a.
2. Depositing a second layer 52 over a surface of the first layer 51. See FIG. 5b,
3. Depositing a third layer 53 over a surface of the second layer 52. See FIG. 5c.
4. Etching the three layers 51-53 to form separate rods 14. See FIGS. 1-2.

The second layer 52 can be a reflective material. One of the first layer 51 or the third layer 53 can be an absorptive material and the other can be a transparent material.

What is claimed is:

1. A wire grid polarizer (WGP) comprising an array of parallel, elongated rods located over a surface of a transparent substrate with gaps between adjacent rods, wherein:
   a. each of the rods includes a reflective wire sandwiched between a transparent rib and an absorptive rib;
   b. material of the transparent rib is different from material of the transparent substrate;
   c. an index of refraction (n) of the transparent rib is greater than 1.9; and
   d. an extinction coefficient (k) of the transparent rib is less than 0.01.

2. The WGP of claim 1, wherein:
   a. the WGP has efficiency of at least 85% and contrast of at least 2000 for a wavelength of visible light incident from a 45° angle on a transparent rib side of the WGP, where:
      efficiency means a fraction of transmission through the WGP of a predominantly transmitted polarization times a fraction of reflection of an opposite polarization off of the WGP; and
      contrast means the fraction of transmission through the WGP of the predominantly transmitted polarization divided by a fraction of transmission through the WGP of the opposite polarization; and
   b. Rs of less than 15% for the wavelength of visible light incident from a 45° angle on an absorptive rib side of the WGP, where Rs is the fraction of reflection of the opposite polarization off of the WGP.

3. A wire grid polarizer (WGP) comprising an array of parallel, elongated rods located over a surface of a transparent substrate with gaps between adjacent rods, wherein:
   a. each of the rods includes a reflective wire sandwiched between a transparent rib and an absorptive rib; and
   b. a material of the transparent rib is different from a material of the transparent substrate, or the transparent rib is spaced apart from the transparent substrate, or both.

4. The WGP of claim 3, wherein the transparent rib comprises aluminum nitride, hafnium oxide, silicon carbide, silicon nitride, tantalum pentoxide, titanium dioxide, zinc sulfide, or combinations thereof.

5. The WGP of claim 3, wherein an index of refraction (n) of the transparent rib, at a light wavelength of intended use, is greater than 1.9.

6. The WGP of claim 3, wherein an extinction coefficient (k) of the transparent rib, at a light wavelength of intended use, is less than 0.01.

7. The WGP of claim 3, wherein at a light wavelength of intended use:
   a. an index of refraction (n) of the transparent rib is greater than 2.0; and
   b. an extinction coefficient (k) of the transparent rib is less than 0.001.

8. The WGP of claim 3, wherein the WGP has efficiency of at least 85% and contrast of at least 2000 for a wavelength of visible light incident from a 45° angle on a transparent rib side of the WGP, where:
   efficiency means a fraction of transmission through the WGP of a predominantly transmitted polarization times a fraction of reflection of an opposite polarization off of the WGP; and
   contrast means the fraction of transmission through the WGP of the predominantly transmitted polarization divided by a fraction of transmission through the WGP of the opposite polarization.

9. The WGP of claim 3, wherein the WGP has efficiency of at least 87% and contrast of at least 3500 for a wavelength of visible light incident from a 45° angle on a transparent rib side of the WGP, where:
   efficiency means a fraction of transmission through the WGP of a predominantly transmitted polarization times a fraction of reflection of an opposite polarization off of the WGP; and
   contrast means the fraction of transmission through the WGP of the predominantly transmitted polarization divided by a fraction of transmission through the WGP of the opposite polarization.

10. The WGP of claim 3, wherein:
    a. the WGP has efficiency of at least 85% and contrast of at least 2000 for a wavelength of visible light incident from a 45° angle on a transparent rib side of the WGP, where:
       efficiency means a fraction of transmission through the WGP of a predominantly transmitted polarization times a fraction of reflection of an opposite polarization off of the WGP; and
       contrast means the fraction of transmission through the WGP of the predominantly transmitted polarization divided by a fraction of transmission through the WGP of the opposite polarization; and
    b. Rs of less than 15% for the wavelength of visible light incident from a 45° angle on an absorptive rib side of the WGP, where Rs is the fraction of reflection of the opposite polarization off of the WGP.

11. The WGP of claim 3, wherein the WGP forms part of an image projector, the image projector comprising:
    a. a light source capable of emitting a beam of light;
    b. a projection lens system located to receive at least part of the beam of light and capable of projecting an image;
    c. a spatial light modulator:
       i. located to receive, in a light path between the light source and the projection lens system, at least part of the beam of light; and
       ii. having a plurality of pixels, each pixel capable of receiving a signal and transmitting at least part of the beam of light without causing a change in polarization, or rotating a polarization of at least part of the beam of light, based on the signal;
    d. the WGP located in at least part of the beam of light prior to entering the spatial light modulator, or after exiting the spatial light modulator, or both, with the transparent rib facing the spatial light modulator.

12. The WGP of claim 3, wherein the absorptive rib is located closer to the substrate than the transparent rib.

13. The WGP of claim 3, wherein material of the transparent rib, at a thickness of the transparent rib, is capable of transmitting greater than 90% and absorbing less than 10% of light in the wavelength range of use, ignoring Fresnel reflection losses.

14. The WGP of claim 3, wherein a material of the transparent rib is different from a material of the transparent substrate.

15. A wire grid polarizer (WGP) comprising an array of parallel, elongated rods located over a surface of a transparent substrate with gaps between adjacent rods, wherein:
    a. each of the rods includes a reflective wire sandwiched between a transparent rib and an absorptive rib;
    b. material of the transparent rib, at a thickness of the transparent rib, is capable of transmitting greater than 90% and absorbing less than 10% of light in the wavelength range of use, ignoring Fresnel reflection losses; and c. material of the transparent rib is different from material of the transparent substrate.

16. The WGP of claim 15, wherein at a light wavelength of intended use:
   a. an index of refraction (n) of the transparent rib is greater than 1.9; and
   b. an extinction coefficient (k) of the transparent rib is less than 0.01.

17. The WGP of claim 15, wherein the WGP has efficiency of at least 85% and contrast of at least 2000 for 650 nanometer light incident from a 45° angle on a transparent rib side of the WGP, where:
   efficiency means a fraction of transmission through the WGP of a predominantly transmitted polarization times a fraction of reflection of an opposite polarization off of the WGP; and
   contrast means the fraction of transmission through the WGP of the predominantly transmitted polarization divided by a fraction of transmission through the WGP of the opposite polarization.

18. The WGP of claim 15, wherein the WGP has efficiency of at least 87% and contrast of at least 3500 for 650 nanometer light incident from a 45° angle on a transparent rib side of the WGP, where:
   efficiency means a fraction of transmission through the WGP of a predominantly transmitted polarization times a fraction of reflection of an opposite polarization off of the WGP; and
   contrast means the fraction of transmission through the WGP of the predominantly transmitted polarization divided by a fraction of transmission through the WGP of the opposite polarization.

19. The WGP of claim 15, wherein:
   a. the WGP has efficiency of at least 85% and contrast of at least 2000 for a wavelength of visible light incident from a 45° angle on a transparent rib side of the WGP, where:
      efficiency means a fraction of transmission through the WGP of a predominantly transmitted polarization times a fraction of reflection of an opposite polarization off of the WGP; and
      contrast means the fraction of transmission through the WGP of the predominantly transmitted polarization divided by a fraction of transmission through the WGP of the opposite polarization; and
   b. Rs of less than 15% for the wavelength of visible light incident from a 45° angle on an absorptive rib side of the WGP, where Rs is the fraction of reflection of the opposite polarization off of the WGP.

20. The WGP of claim 15, wherein the WGP forms part of an image projector, the image projector comprising:
   a. a light source capable of emitting a beam of light;
   b. a projection lens system located to receive at least part of the beam of light and capable of projecting an image;
   c. a spatial light modulator:
      i. located to receive, in a light path between the light source and the projection lens system, at least part of the beam of light; and
      ii. having a plurality of pixels, each pixel capable of receiving a signal and transmitting at least part of the beam of light without causing a change in polarization, or rotating a polarization of at least part of the beam of light, based on the signal;
   d. the WGP located in at least part of the beam of light prior to entering the spatial light modulator, or after exiting the spatial light modulator, or both, and the surface on which the elongated rods are located faces the spatial light modulator.

* * * * *